E. SCHNEIDER.
HAND OPERATED APPARATUS FOR LOADING LARGE GUNS.
APPLICATION FILED FEB. 14, 1918.

1,310,143.

Patented July 15, 1919.

E. SCHNEIDER.
HAND OPERATED APPARATUS FOR LOADING LARGE GUNS.
APPLICATION FILED FEB. 14, 1918.

1,310,143.

Patented July 15, 1919.
5 SHEETS—SHEET 2.

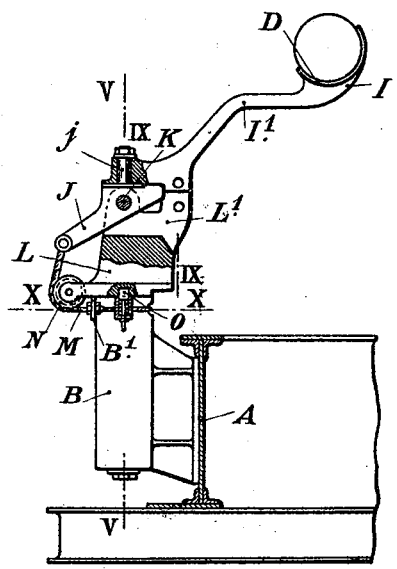
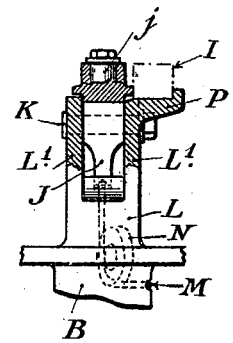
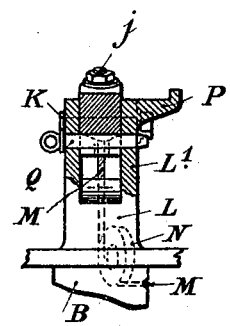

E. SCHNEIDER.
HAND OPERATED APPARATUS FOR LOADING LARGE GUNS.
APPLICATION FILED FEB. 14, 1918.

1,310,143.

Patented July 15, 1919.
5 SHEETS—SHEET 5.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

HAND-OPERATED APPARATUS FOR LOADING LARGE GUNS.

1,310,143.  Specification of Letters Patent.  Patented July 15, 1919.

Application filed February 14, 1918. Serial No. 217,194.

*To all whom it may concern:*

Be it known that I, EUGÈNE SCHNEIDER, a citizen of the Republic of France, and a resident of 42 Rue d'Anjou, Paris, France, have invented new and useful Improvements in Hand-Operated Apparatus for Loading Large Guns, which invention is fully set forth in the following specification.

This invention has for its object to provide an improved apparatus capable of being operated by hand for loading large guns.

The improved apparatus is designed to enable the loading operations to be effected with the least expenditure of power. For this purpose, the improved apparatus comprises in the usual manner a footstep bearing in which an arm for supporting a loading scoop is adapted to turn, but it is characterized by the feature that the said footstep bearing and said arm are arranged relatively to each other in such a manner that the elevating of the scoop from its initial position where it receives the gun charge, into its position of arrival for loading the gun with the projectile, is effected with a continuous rotation of the scoop, the rising of the latter resulting automatically from the movement of pivotation of the arm in the footstep bearing. The path traversed by the gun charge during its elevation movement is increased by the fact that the charge passes from the initial position into the arrival position by describing an ascending curve, thereby reducing the expenditure of power to the amount which would be necessary if the projectile were elevated without causing it to describe a rotary movement at the same time.

Two embodiments of this invention are illustrated by way of example in the accompanying drawings in which:—

Fig. 1 is a side elevation, partly in vertical section, of a gun provided with the improved apparatus.

Fig. 2 is an end elevation, partly in vertical section, on the line II—II of Fig. 1.

Fig. 3 is a plan.

Fig. 4 is a section of a detail drawn to a larger scale, on the line IV—IV of Fig. 1.

Figs. 5 to 11 illustrate a second embodiment.

Fig. 5 is a side elevation, partly in section, on the line V—V of Fig. 6.

Fig. 6 is an end view, partly in section, on the line VI—VI of Fig. 5.

Fig. 7 is a plan of Fig. 5.

Fig. 8 is a side elevation, partly in vertical section, showing the apparatus in position for transport.

Fig. 9 is a section of a detail drawn to a larger scale, on the line IX—IX of Fig. 6.

Fig. 10 is a section of a detail drawn to a larger scale, on the line X—X of Fig. 6.

Fig. 11 is a section of a detail drawn to a larger scale, on the line XI—XI of Fig. 8.

The improved apparatus comprises a footstep bearing B which is attached at a suitable point A of the gun carriage, and in which there is adapted to revolve the pivot C of an arm carrying at its free end the loading scoop D.

Figure 1:
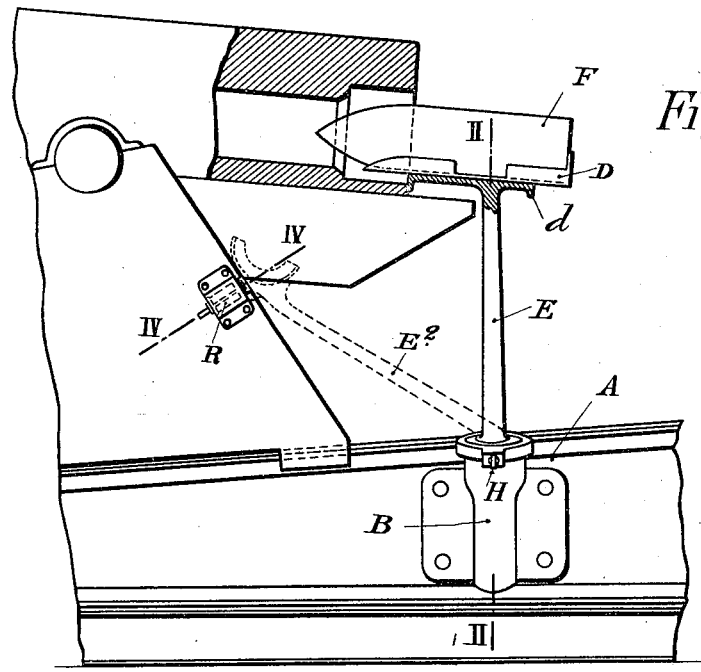
Figures 1 to 4 illustrate a first embodiment.
Figure 2:
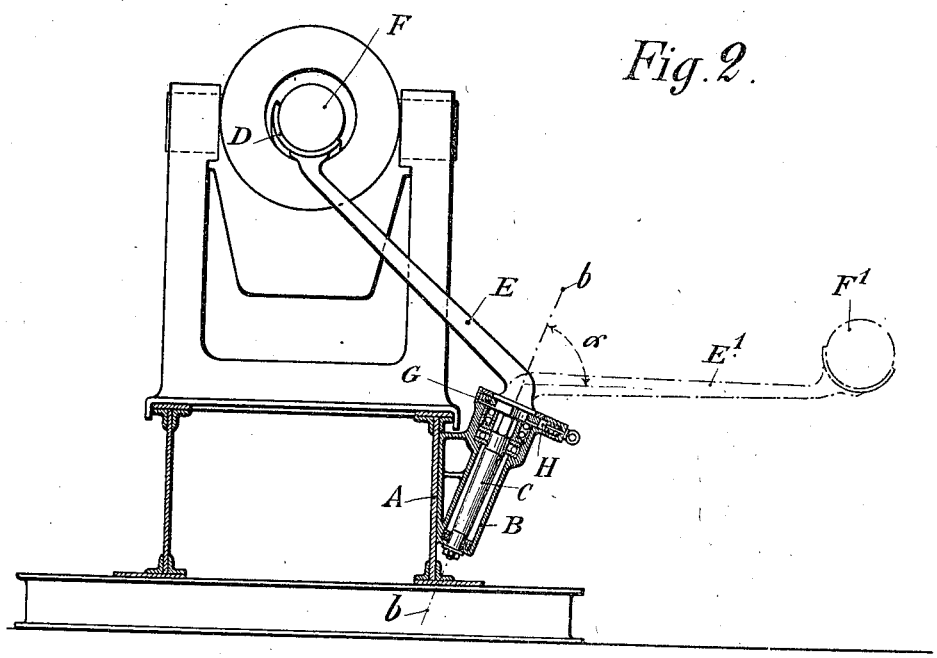

In the embodiment shown in Figs. 1 to 4, the footstep bearing B is fixed on the gun carriage in an inclined geometrical axis $b$—$b$ (Fig. 2). The scoop-carrying arm E is fixed to the pivot C at an angle in such a manner that when the arm is revolved, it will describe in so revolving, a conical surface of revolution having as its axis the inclined axis $b$—$b$ of the footstep bearing B.

Figure 3:
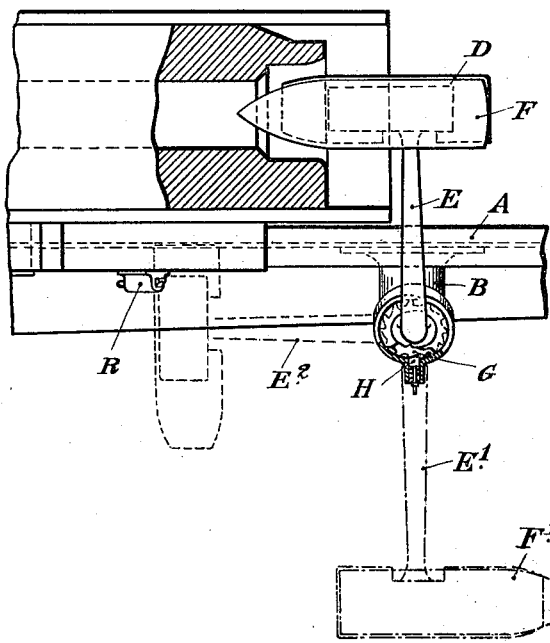

It is to be understood that the gun charge F can be elevated by means of a continuous rotational movement imparted to the arm E in order to cause it to pass from its initial, *i. e.*, lowest position $F^1$ indicated in dot and dash lines in Figs. 2 and 3, into its arrival position, *i. e.*, highest position F indicated in full lines, and in which latter position the scoop D is situated in the proper position for loading the gun charge into the gun.

On the pivot C there may be mounted a ratchet wheel G whose teeth during the elevation of the gun charge, will slip over the suitably beveled nose of a spring bolt H, in such a manner as to allow of the arm E when left to itself, being automatically locked in any intermediate position between $E^1$ and E, as well as in the end positions.

When the gun has been loaded, then by pushing back the bolt H by hand, the arm E can be allowed to descend by its own weight from its arrival position into its initial position $E^1$.

For transport, the scoop-carrying arm E may be raised into the position E² indicated by dotted lines in Figs. 1 and 3, and it may be locked in said position, for instance against the side of the gun carriage by means of a spring bolt R.

Figure 4:
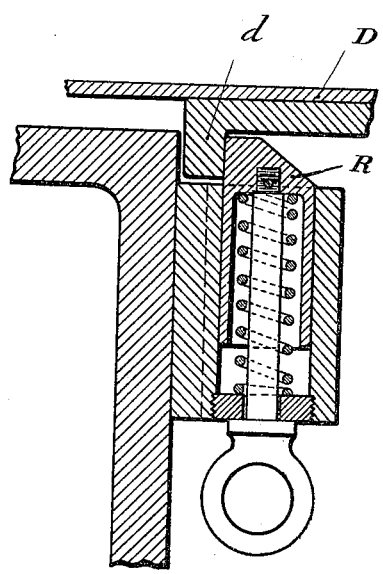

$d$ is a projection on the scoop D; in sliding over the bevel of the bolt R the said projection engages behind the latter as shown in Figs. 1 and 4.

It is to be understood that in the very simple apparatus hereinbefore described, the elevation of the scoop D is effected directly and automatically as a result of the rotation of the arm E in the foot-step bearing, in a continuous movement, by pushing the arm E, which pushing requires only a very small expenditure of power.

In the example shown in Figs. 5 to 11, the improved apparatus comprises a footstep B which may be fixed vertically to the gun carriage A.

The arm that carries the scoop D is here constituted by a jib I—J in the form of a rocking beam fulcrumed by means of a horizontal axle pin K on a bracket L fixed to the pivot C.

To the free end of the arm J of the rocking beam I—J, there is attached one end of a rope M passing over a pulley N carried by the bracket L. This rope is adapted to be wound on to the outside of the footstep bearing B during the elevation of the gun charge, and is attached for this purpose to a projection B¹ of the bearing after it has passed through a guide eye B².

In the example shown, the rocking beam I—J is made in two parts, the arm J being adapted to oscillate on the axle K between the sides L¹ of a block formed on the bracket L. The arm J carries with it in its rocking movement, the arm I which is pivoted to J by means of an axle pin $j$ and normally oscillates with arm J between the sides L' of bracket L. The rotation of the arm I about the pivot $j$ is possible only at the instant when portion I' of arm I clears the sides L' of bracket L or when the scoop D has arrived in its position of highest elevation.

In this embodiment the improved apparatus comprises further an automatic engagement device between the bracket L and the footstep bearing B, in the position of maximum elevation of the scoop D. The rotational movement of the arm I about the pivot $j$ allows, as hereinafter described, of completing the movement of the scoop for the purpose of loading the gun.

Figure 5:
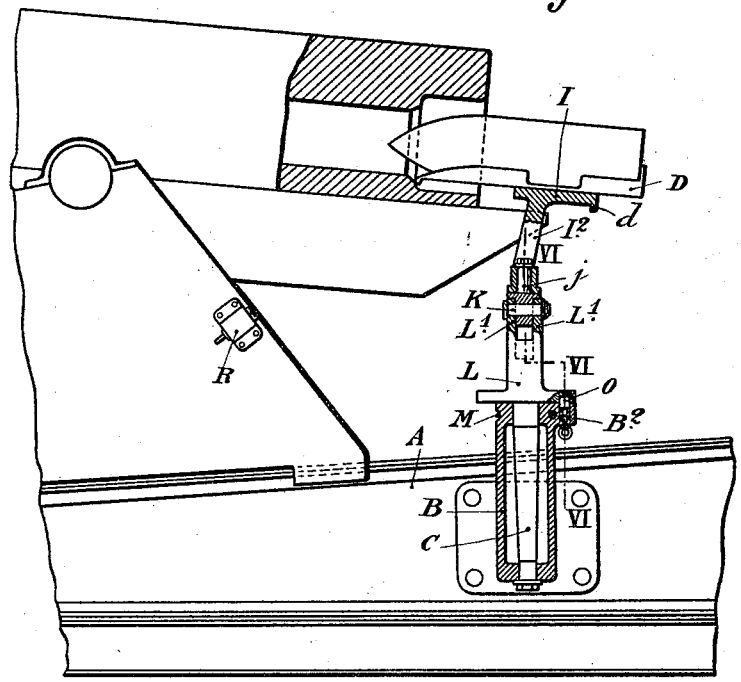
Figure 7:
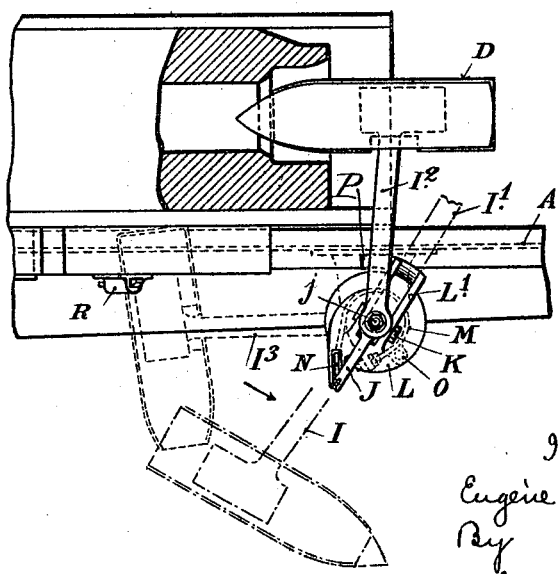
Figure 12:
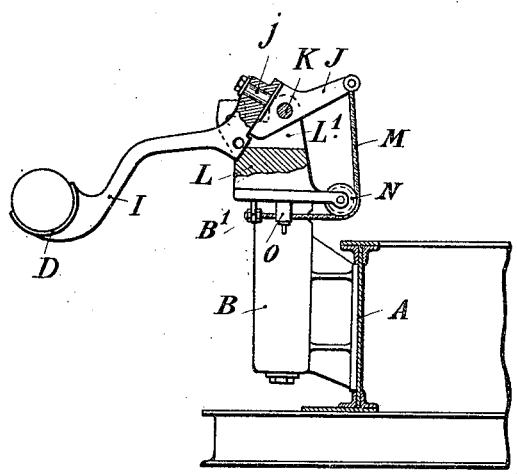
Fig. 12 is an elevation, partly in section, similar to that shown in Fig. 6, showing the parts of the apparatus in the initial position.

At starting, the parts are in the positions shown in Fig. 12 and indicated in dot and dash lines in Fig. 7; the rope M being unwound. If a push be exerted in the direction of the arrow (Fig. 7) upon the arm I that carries the scoop, this will move also the bracket L which will turn on its pivot C in the footstep bearing B. In this movement the rope M will wind around the bearing B and thus cause the arm J to move down. The result is that the arm I will rise until it arrives in the position I¹ shown in Fig. 6, and partially indicated in dot and dash lines in Fig. 7. At this instant the bolt O will engage automatically in a corresponding socket in the bracket L and will thus lock the latter in position. If the arm I be continued to be pushed in the same direction, it will turn about the axis $j$ which will become disengaged from the sides L¹ as explained above. In turning, the arm I may be lightened by bearing upon a guide P projecting from one of the sides L¹ of the bracket L. It is thus brought finally into the loading position I² (Figs. 5 and 7).

Figure 8:
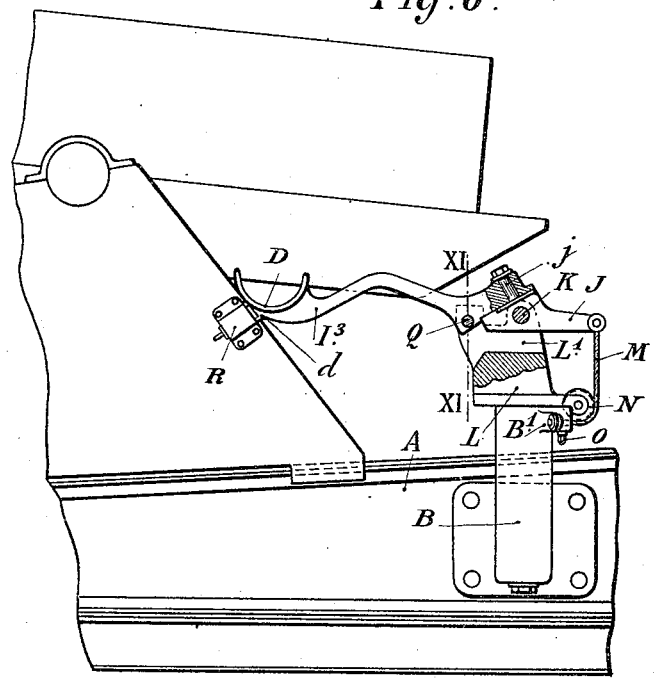

For transport, the rocking beam I—J and the bracket L may be pushed into the position I³ shown in Figs. 8 and 11 and indicated in dotted lines in Fig. 7. As in the preceding example, an engagement by means of a spring bolt R may be provided between the arm I and the side of the gun carriage for the purpose of fixing the apparatus in this position.

In addition, the arm I may be pinned in the same position upon the block L¹ by means of a pin Q.

What I claim is:—

1. In a hand-operated apparatus for loading large guns, the combination with the gun carriage, of a vertical footstep bearing fixed to the gun carriage, a pivot revolubly mounted in said bearing, a bracket fixed to said pivot, a horizontal pivot pin in said bracket, an arm for carrying a loading scoop mounted so as to rock on said pivot pin, and a rope attached at one end to said arm and at its other end to said bearing, whereby a rotational movement of said arm will produce automatically its elevation by turning on said horizontal pivot pin by reason of said rope becoming wound around said bearing.

2. In manually-operated apparatus for loading large guns, the combination of a horizontally swinging bracket and a support therefor, a vertically swinging lever mounted on said bracket, a loading scoop having an arm revolubly mounted on said lever and adapted to swing about an axis normal to that of said lever, means normally confining said arm to oscillate with said lever, and a flexible connection between said support and the power arm of said lever whereby rotational movement of said bracket in one direction applies power to said lever to elevate said scoop and release the scoop arm for swinging into loading position.

3. In manually-operated apparatus for loading large guns, the combination of a horizontally swinging bracket and a support therefor, a vertically swinging lever mounted on said bracket, a loading scoop having an arm revolubly mounted on said lever and adapted to swing about an axis normal to that of said lever, means normally confining said arm to oscillate with said lever, a flexible connection between said support and the power arm of said lever whereby rotational movement of said bracket in one direction applies power to said lever to elevate said scoop and release the scoop arm for swinging into loading position, said bracket having a side member adapted to support said scoop arm when swinging into loading position, and means for locking said scoop arm in transporting position.

4. In manually-operated apparatus for loading large guns, the combination of a horizontally swinging bracket and a support therefor, a vertically swinging lever mounted on said bracket, a loading scoop having an arm revolubly mounted on said lever and adapted to swing about an axis normal to that of said lever, means normally confining said arm to oscillate with said lever, and a flexible connection between said support and the power arm of said lever whereby rotational movement of said bracket in one direction applies power to said lever to elevate said scoop and release the scoop arm for swinging into loading position, said bracket having a side member the top of which is adapted to support said scoop arm when swinging into loading position.

In testimony whereof I have signed this specification.

EUGÈNE SCHNEIDER.

Witnesses:
  ANDRÉ MOSTICKER,
  CHAS. P. PRESSLY.

Copies of this patent may be obtained for five cents each, by addressing the "Commissioner of Patents, Washington, D. C."